United States Patent
Crate et al.

(10) Patent No.: US 6,904,440 B2
(45) Date of Patent: Jun. 7, 2005

(54) MULTI-TIER MATERIAL REQUIREMENTS FLOWDOWN GENERATION

(75) Inventors: Wendy L Crate, North Granby, CT (US); Ryan J. Walsh, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 314 days.

(21) Appl. No.: 10/252,866

(22) Filed: Sep. 23, 2002

(65) Prior Publication Data

US 2004/0059751 A1 Mar. 25, 2004

(51) Int. Cl.$^7$ .............................................. G06F 17/30
(52) U.S. Cl. .................... 707/104.1; 700/100; 705/7
(58) Field of Search ..................... 707/104.1; 700/100; 705/7

(56) References Cited

U.S. PATENT DOCUMENTS

| | | | | |
|---|---|---|---|---|
| 5,089,970 A | * | 2/1992 | Lee et al. ..................... 700/96 |
| 5,231,567 A | * | 7/1993 | Matoba et al. ............... 700/100 |
| 5,594,639 A | * | 1/1997 | Atsumi ........................ 700/107 |
| 6,415,196 B1 | * | 7/2002 | Crampton et al. ........... 700/100 |
| 2004/0117048 A1 | * | 6/2004 | Wei ............................. 700/100 |
| 2004/0117227 A1 | * | 6/2004 | Wei ............................... 705/7 |

* cited by examiner

*Primary Examiner*—Charles Rones
(74) *Attorney, Agent, or Firm*—Bachman & LaPointe, P.C.

(57) ABSTRACT

A method of producing a master sub-tier schedule for a Multi-tier Manufacturing Requirements Planning (MRP) system comprising the steps of populating a database with a plurality of identified part/supplier combinations for at least one finished part, populating the database with a plurality of sub-process steps associated with each of the at least one finished part, populating the database with at least one supplier responsible for each of the plurality of sub-process steps, populating the database with at least one lead time and at least one lot requirement associated with each of the plurality of sub-process steps, and sending notification to the primary consumer and the first tier supplier if necessitated by the reviewing of the master sub-tier schedule.

11 Claims, 3 Drawing Sheets

MULTI-TIER MATERIAL REQUIREMENTS FLOWDOWN GENERATION

BACKGROUND OF THE INVENTION (1) Field of the Invention

The present invention relates to a method for generating a master sub-tier schedule. Specifically, the present invention relates to a method for configuring a Multi-tier Manufacturing Requirements Planning (MRP) system which allows for primary consumer, first-tier supplier, and sub-tier supplier input so as to enable the automated generation of a master sub-tier schedule.

(2) Description of Related Art

It is known in the art to configure a centralized database to act as a server so as to enable a plurality of parties to gain access to the database. With the advent of the internet, there exists the widespread ability to interact with myriad forms of data repositories in a standardized manner. With specific regards to the manufacturing of industrial parts, it is possible to store all manner of information regarding the production of such parts in a database. Such data is typically stored in a Multi-tier Manufacturing Requirements Planning (MRP). Such data might include the first-tier and sub-tier providers of constituent components of the finished part, as well as process steps required to construct the part, the lead times required at each point in the manufacturing process, and the contact information of the sub-tier providers.

What is therefore needed is a method of storing and providing access to a Multi-tier Manufacturing Requirements Planning (MRP) to primary consumers and sub-tier providers that allows for robust editing by consumers and suppliers alike, provides automated generation of a master sub-tier schedule, and generates electronic notifications in the event that changes to the Multi-tier Manufacturing Requirements Planning (MRP) system require.

SUMMARY OF THE INVENTION

Accordingly, it is an object of the present invention to provide a method for generating a master sub-tier schedule.

In accordance with the present invention, a method of producing a master sub-tier schedule for a Multi-tier Manufacturing Requirements Planning (MRP) system comprises the steps of populating a database with a plurality of identified part/supplier combinations for at least one finished part, populating the database with a plurality of sub-process steps associated with each of the at least one finished part, populating the database with at least one supplier responsible for each of the plurality of sub-process steps, populating the database with at least one lead time and at least one lot requirement associated with each of the plurality of sub-process steps, accessing the database to calculate at least one line item of a sub-tier schedule, the at least one line item comprising at least one sub-tier schedule quantity and at least one requirement date corresponding thereto, adding each of the at least one line items to form a master sub-tier schedule on the database, breaking down the master sub-tier schedule by each of the at least one supplier, providing access to the master sub-tier schedule to a primary consumer, at least one first-tier supplier and at least one sub-tier supplier, reviewing the master sub-tier schedule, and sending notification to the primary consumer and the first tier supplier if necessitated by the reviewing of the master sub-tier schedule.

DETAILED DESCRIPTION OF THE PREFERRED EMBODIMENT(S)

Figure 1:
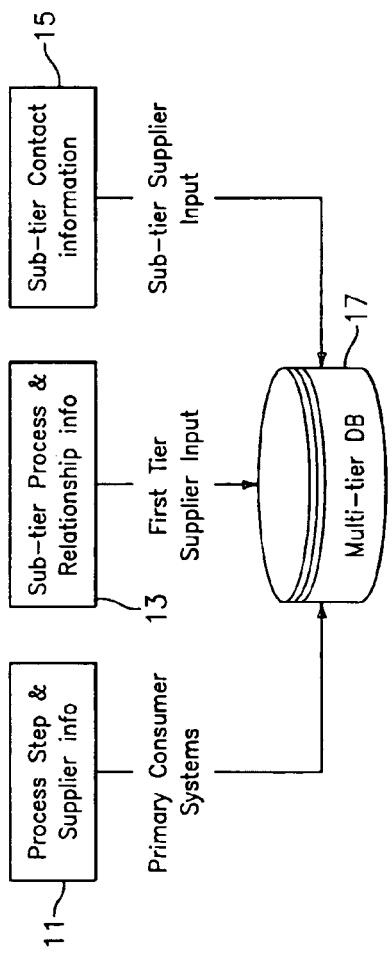
FIG. 1 A schematic diagram of the MRP system of the present invention.

The present invention incorporates the architecture illustrated in FIG. 1 to achieve a Multi-tier Manufacturing Requirements Planning (MRP) system. As is described more fully below, a primary output of the MRP system of the present invention is a master sub-tier schedule viewable by sub-tier providers of goods and services to a primary consumer. In order to generate a sub-tier schedule, specific data about the primary consumer's parts, part processes, and suppliers needs to be available. As discussed more fully below, the Multi-tier MRP system of the present invention requires the primary consumer, the first tier, and sub-tier suppliers to provide and maintain a certain amount of data for use in the generation of the sub-tier schedule.

The primary consumer is responsible for inputting primary consumer data 11 which includes part, supplier and material requirement data. In a preferred embodiment, this information is obtained electronically through an internet interface in communication with a centralized Multi-tier database (DB) 17. Multi-tier database 17 is comprised of a plurality of tables which contain the information inputted and accessed by the primary consumer, first-tier suppliers and sub-tier suppliers.

First tier suppliers are responsible for inputting sub-tier data 13 which includes sub-tier process and relationship data into Multi-tier database 17. First tier suppliers have the ability to populate and maintain the data through a supplier portal. As used herein, "supplier portal" refers to an interactive electronic means of accessing, inputting, and displaying schedule data including, but not limited to, the internet. The supplier portal is constructed such that the suppliers can manually input the data or send a file that will be loaded directly into the Multi-tier database.

Sub-tier suppliers are responsible for inputting sub-tier data 15 into the Multi-tier database 17 which includes contact information and verifying that lot size and lead time requirements to supply a part are correct. In some cases, sub-tier suppliers will have the same responsibilities as first tier suppliers if they are sourcing processes or materials that the primary consumer would like to monitor. A web-based interface will provide sub-tier suppliers the ability to populate and maintain the data through the supplier portal.

Figure 2:
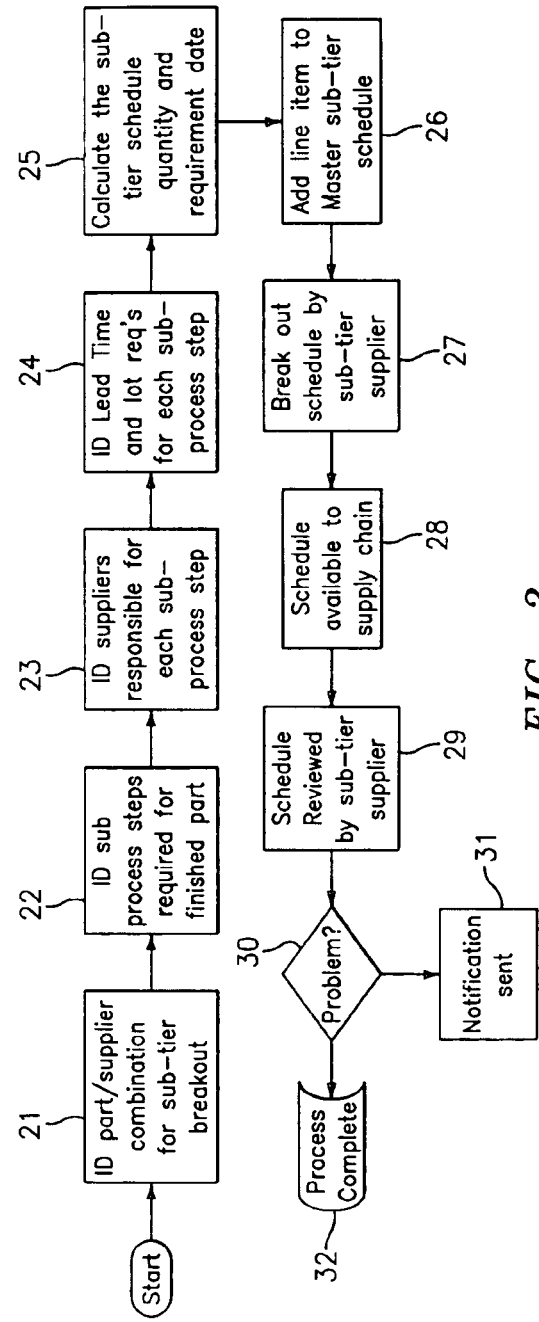
FIG. 2 A block diagram of the process flow of the master sub-tier generation method of the present invention.

With reference to FIG. 2, there is illustrated the process flow required in generating the master sub-tier schedule of the present invention. It is a central feature of the MRP system to generate a master sub-tier schedule using the primary consumer's material requirements and information collected from the first tier and sub-tier suppliers. The sub-tier schedule is accessed by the sub-tier suppliers who make use of it for material and production planning.

The initial step required to begin the generation the master sub-tier schedule occurs when the primary consumer identifies a plurality of finished part number/supplier combinations where the sub-tier requirements need to be defined in greater detail as illustrated in step 21. Once the finished part requirements for the identified part number/supplier combinations are entered into a Multi-tier database 17, the multi-tier MRP system proceeds to identify the process steps 22 and sequence of these steps for each finished part/supplier combination, associate each sub-process with the responsible sub-tier supplier 23, identify the lead time and lot requirements associated with each sub-tier supplier 24, and calculate the sub-process/material quantity and requirement date 25.

As noted, the Multi-tier database 17 comprises a plurality of tables that are populated and maintained by the primary consumer and suppliers, the function of which is to identify the process steps and sequence of the steps for each finished part/supplier combination. For example, the tables might identify that finished part 12345 supplied by ABC company has 3 process steps. The first step is obtaining raw material RM12345, the second is creating forging 90F38928, and the third is machining the finished part 12345.

Once the process steps are known, each step is then be associated with the responsible sub-tier supplier's information. For example, the tables might identify that raw material RM12345 is supplied by Rawmat Company, forging 90F38928 is supplied by Bigforge Company and the final machining work is done by the finished part supplier ABC company.

Figure 3:
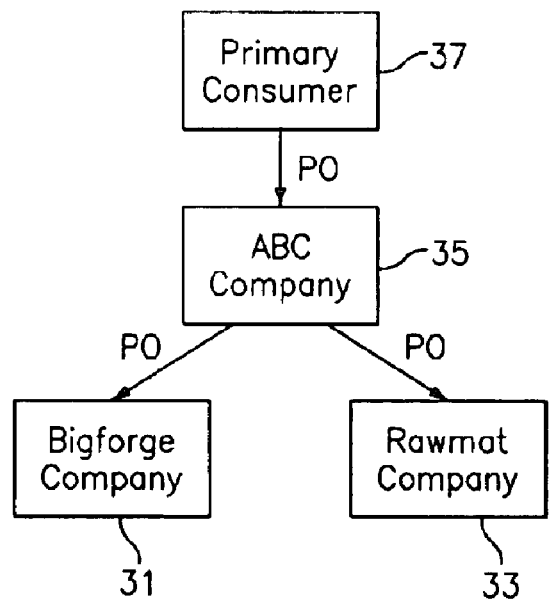
FIG. 3 An exemplary configuration of a primary consumer, first-tier supplier, and sub-tier suppliers.
Figure 4:
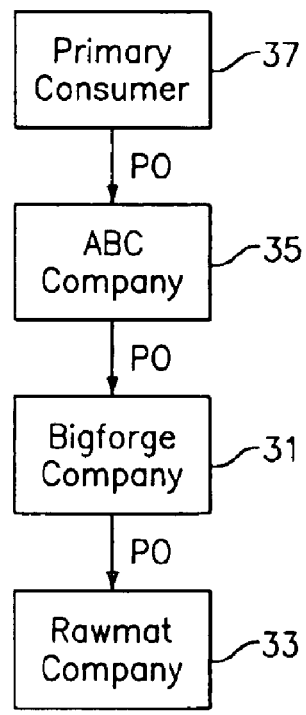
FIG. 4 An exemplary configuration of a primary consumer, first-tier supplier, and sub-tier suppliers.

Defining the relationship of each supplier to each other and to the primary consumer is critical. The MRP system presents and processes information differently depending on the role of the individual supplier, their relationship to the other suppliers in the chain and their relationship to the primary consumer. With reference to FIG. 3, there is illustrated a model where the role of ABC Company 35 is to procure and control material flow between several suppliers in the chain. As illustrated for exemplary purposes, ABC Company 35 is a first-tier supplier, while Bigforge Company 31, and Rawmeat Company 33 are sub-tier suppliers. In this model, the system will hold ABC Company 35 responsible for maintaining part information for both Bigforge 31 and Rawmat 33. The role of ABC Company 35 differs as illustrated in FIG. 4 where the role of ABC Company 35 is to procure and control material flow from Bigforge 31 only. In this example, ABC Company 35 is responsible for Bigforge 31, only. Bigforge is responsible for maintaining Rawmat's 33 part information.

With continued reference to FIG. 2, once the process steps, sub-tier suppliers and associated relationship models are identified, the lead time and lot requirements are identified as shown in step 24. The required date for each sub-process is then calculated using the lead-time for that step as shown in step 25. The sub-process quantity is dependent upon the number of units per finished part and the finished part requirements. Minimum lot sizes are also taken into consideration. If the supplier provided lot-size information, this information is noted when the sub-tier schedule is presented to the suppliers.

This MRP system is broadly drawn to encompass different relationship models. In addition to the models specified above, the system is able to accommodate relationships where the primary supplier directly procures forgings, castings, and/or raw material to be machined in-house or sourced to an external machine shop.

The sub-tier schedule is made available to suppliers via a supplier portal as shown in step 28. The timeframe for revisions/updates (i.e. daily, weekly, monthly, etc.) may be determined by a system administrator and stored on the MRP system. The suppliers are able to view and review their schedule on-line or download a copy in a standard format as shown in step 29 and described more fully below.

If, subsequently, a supplier foresees a problem meeting the sub-tier requirement schedule as shown at step 30, they are responsible for providing feedback and alerting all interested parties as quickly as possible as shown at step 31. The ability to provide feedback to the primary consumer and send alerts of potential or actual problems will be available through the supplier portal. In addition, the suppliers receive special notifications and alerts if a significant change has been made to the schedule. If the sub-tier supplier sees no apparent problems following the schedule review of step 29, the process is completed and terminates at step 32.

As noted, the schedule is preferably delivered in a web format. The primary consumer is provided with the ability to update the scheduling real time or as desired. Suppliers gain access to the schedule via the supplier portal. Suppliers also have the ability to download the schedule in a standard format via the internet.

A supplier has the ability to enter all information required either manually via an HTML form or by uploading the information using a standard file format. In a preferred embodiment, a direct system to system link is incorporated.

The MRP system can generate electronic notifications via e-mail. Specifically, an automatic electronic notification is generated by the system and sent to the first tier suppliers in the following instances: (1) a supplier profile has been successfully set up, (2) notification of the need to update the sub-tier information in the system, and (3) notification that a major change has been added to the schedule.

The system generates an automatic electronic notification to be sent to the sub tier supplier in the following instances: (1) a supplier profile has been successfully set up, (2) the MRP schedule has been sent to the sub-tier, (3) to post notification of the need to update the sub-tier information in the system, (4) to post notification that the changes have been implemented from the sub-tier information update, and (5) to notify to suppliers of a new MRP schedule.

The first tier supplier can modify the schedule to best suit requirements for delivery of goods from the sub-tier. Regardless of the modifications that are made, the integrity of the primary consumer requirements will remain intact. The modifications or adjustments will be noted but will not actually change the schedule as presented by the primary consumer.

The system gives the first tier supplier the ability to modify the MRP Schedule in the following ways: (1) schedule requirements can be combined (i.e. the primary consumer may indicate that ten units per week are needed, but the first tier may want all on one date in the month.), and (2) requirements can be increased based on lot sizes or special requirements (i.e. the primary consumer indicates that ten units are needed but the first tier wants twenty units.)

In a preferred embodiment, the first tier supplier does not have the ability to note a reduction in quantity or push out required dates on to the sub tier schedule without an exception from the primary consumer. Modifications and notes made by suppliers are maintained in the Multi-tier database 17 so they will remain with each generation of the sub-tier schedule.

In a preferred embodiment, the system can accommodate a situation where a direct supplier has multiple sources for the sub-process or material. The system provides the ability to input the percentage of requirements each supplier should receive. The suppliers are then afforded the ability to modify these requirements once the primary consumer sub-tier schedule is presented to them. The suppliers are afforded the ability to either add or subtract requirements from each supplier but the total must be greater than or equal to the amount needed to meet the finished part requirement.

In a preferred embodiment, the system can accommodate lot requirements as specified by the first and sub-tier suppliers. These lot requirements will be treated as all other supplier modifications and will be a noted change vs. an actual change to the sub-tier schedule.

Because the lead-time of parts and/or material may change with market conditions, the system provides the ability for the suppliers to input these changes. The suppliers must keep this information updated as the accuracy of the sub-tier schedule depends on it. When a change in lead-time occurs, subsequent requirements use the revised lead time date. Requirements already in the schedule maintain the original required date based on the previously specified lead-time.

In a preferred embodiment, the system will require each primary supplier to enter information regarding the expected length of the relationship with his or her suppliers. Each primary supplier is thus required to enter an LTA expiration date or a date that they expect the relationship to continue through. When building the sub-tier schedule, if the required date is greater than the expiration date on the LTA or expected length of relationship, the item will be flagged. This will prevent the primary consumer from sending requirements to suppliers that may no longer be the source.

In a preferred embodiment, the Multi-tier database 17 is a relational database incorporating a plurality of tables for use in facilitating the MRP system of the present invention. A brief description of each such table as well as a depiction of the column structure of each table are as follow:

MRP Flowdown P/N Table—This table specifies which part number/supplier combinations when found in the MRP schedule should initiate sub-tier requirement processing. This information is maintained by the primary consumer.

| Part Number | Direct Supplier Code |
| --- | --- |

Part Material/Process Step Table—This information specifies the steps associated with creating the finished part. It is used to create the line items of the sub-tier schedule by determining which sub-processes and quantities need to be considered for each finished part. The primary consumer maintains this information.

| Finished P/N | Step Sequence | Process/ Material No. | Qty/ Finished Part | Input Weight per Forg/Casting |
| --- | --- | --- | --- | --- |

MRP Schedule—This information will be generated by the primary consumer and is used to create the line items of the sub-tier schedule. The primary consumer maintains this information.

| Finished P/N | Supplier Code | Quantity Required | Firm/ Forecast | Engine/ Spare | Req'd Date |
| --- | --- | --- | --- | --- | --- |

Supplier Relationship Table—This information will be used to determine what relationship each supplier has to one another. When building the schedule it is critical to know which supplier is responsible for the material/process and who the receiving party is. This table will be used to create the sub-tier schedule line items, specify which suppliers are responsible for the step, determine who needs to approve the schedule and calculate what percentage of the requirements each supplier is to receive. The suppliers are responsible for maintaining this data.

| Finished P/N | Step sequence | Process Material # | PO Org | Supplier | LTA | Exp Date | Direct Supplr | % of Req's |
| --- | --- | --- | --- | --- | --- | --- | --- | --- |

Sub-tier Material/Process Table—It is necessary to assign a unique number to each part process or specific material in order to generate the sub-tier schedule. This table contains this unique number in addition to part and/or process attribute information, lead-time requirements and lot size requirements. This information will be used in the form of part/material attribute sets to be representative of "tiers" in a given supply chain. This information is maintained by the primary consumer.

| Unique Process/ Material # | Desc. | Commodity Code | Alloy | Geometry | Dia | Width | Length | Height |
| --- | --- | --- | --- | --- | --- | --- | --- | --- |

Sub-tier Lot+Lead Time Table—This table contains lead-time and lot size requirements that can be related to a particular attribute set in the Sub-tier Material/Process Table. This information is used to generate required dates, quantities and associated lot requirements within the sub-tier schedule. This information is maintained by the suppliers using this system.

| Unique Process/ Material # | Supplier Code | Lot Size | Lead Time | Internal P/N | Vendor Specs |
|---|---|---|---|---|---|

Supplier Contact Table—This information is used to collect supplier contact information to support communication on the Multi Tier system. This information is maintained by the suppliers.

| Supplier Code | Supplier Name | User Name | User Role | User E-mail |
|---|---|---|---|---|

Sub-tier Schedule Worksheet—This table is used as an interim step in building the sub-tier schedule. As the sub-tier requirements are defined, they are stored in this table. Once all line items are added, the system will evaluate and group line items of the same part, material or process.

| Fin P/N | Fin Part Supplier | Fin P/N Req Date | Fin P/N Req Qty | Sub-process/ Matl # | Sub-process/ Matl Supplier | Notes Desc | Notes desc date |
|---|---|---|---|---|---|---|---|

| PO Org Suppl | Schedule generate date | Alert Desc | Req Date | LTA | LTA exp date | Input Wght/ Fin part | Qty/ Fin part |
|---|---|---|---|---|---|---|---|

P&W Specification Table—This table allows multiple primary consumer specifications to be associated with a Process/Material number. This table is maintained by the primary consumer.

| Unique Material/ Process Number | P&W Spec |
|---|---|

EXAMPLE 1

Figure 5A:
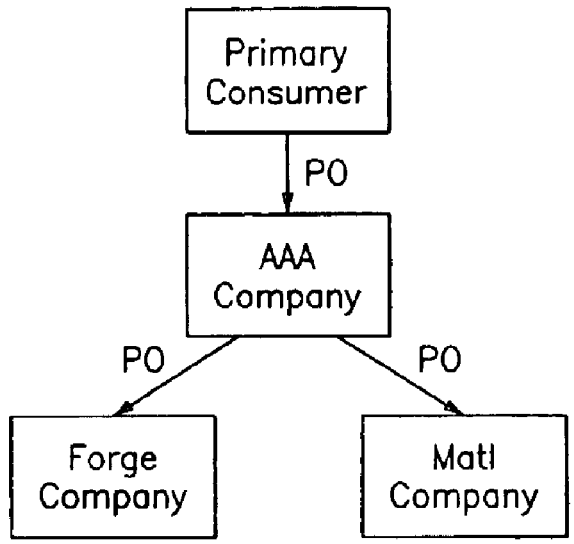
FIG. 5a–b An exemplary configuration of a primary consumer, first-tier supplier, and sub-tier suppliers as well as the flow of parts during the manufacturing process.
Figure 5B:
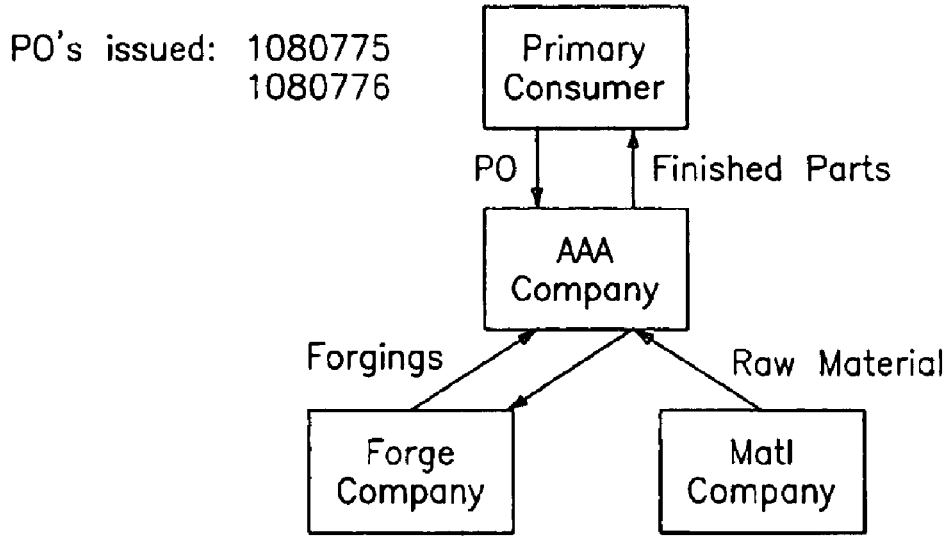

The following illustrates an exemplary generation of a master sub-tier schedule of the present invention wherein the individual steps performed correspond to the steps illustrated in FIG. 2. However, the steps referred to in this example refer to sub-steps comprising steps 25–32 as illustrated in FIG. 2. The example employs the supplier relationship illustrated in FIG. 5a–b and the data populating the tables which follow.

MRP Flowdown p/n table (maintained by the primary consumer):

| Part Number | Supplier Code |
|---|---|
| 1080775 | 31986 |
| 1080776 | 31986 |

Part Material/Process Step Table (maintained by the primary consumer):

| Finished P/N | Step Sequence | Process/ Material No. | Description | Qty/Input Weight per finished Part | Size |
|---|---|---|---|---|---|
| 1080775 | 1 | RM12345 | Raw Material | 98 lbs. | 8 in. |
| 1080775 | 2 | 90F103489 | Forging | 1 | |
| 1080776 | 1 | DN12345 | Raw Material | 150 lbs. | 10 in. |
| 1080776 | 2 | 90F32964 | Forging | 1 | |

MRP Schedule (maintained by the primary consumer):

| Finished P/N | Supplier Code | Quantity Required | Required Date |
|---|---|---|---|
| 1080775 | AAA Co. | 100 | June 2002 |
| 1080775 | AAA Co. | 100 | August 2002 |
| 1080775 | AAA Co. | 50 | October 2002 |
| 1080776 | AAA Co. | 100 | May 2002 |
| 1080776 | AAA Co. | 100 | July 2002 |

Supplier Relationship Table (maintained both by suppliers and the primary consumer):

| Finished P/N | Step sequence | Process Material # | PO Org | Supplier | LTA | Exp Date | % of Req's |
|---|---|---|---|---|---|---|---|
| 1080775 | 1 | RM12345 | AAA Co. | Matl Co. | Y | December 2003 | 100% |
| 1080775 | 2 | 90F103489 | AAA Co. | Forge Co. | Y | June 2004 | 100% |
| 1080775 | F | 1080775 | PW | AAA Co. | Y | June 2003 | 100% |
| 1080776 | 1 | RM12345 | AAA Co. | Matl Co. | Y | December 2003 | 100% |
| 1080776 | 2 | 90F32964 | AAA Co. | Forge Co. | Y | June 2004 | 100% |
| 1080776 | F | 1080776 | PW | AAA Co. | Y | June 2003 | 100% |

Sub-tier Material/Process Table (maintained by suppliers):

| Unique Process/ Material # | Supplier | Lot Size | Lead Time | Internal P/N | Vendor Spec |
|---|---|---|---|---|---|
| RM12345 | Matl Co. | 0 | 18 W | 1B7499 | AMS5662 |
| 90F103489 | Forge Co. | 0 | 12 W | | |
| 1080775 | AAA Co. | 0 | 12 W | | |
| 90F32964 | Forge Co. | 0 | 13 W | | |
| 1080776 | AAA Co. | 0 | 12 W | | |

Generation of the master sub-tier schedule proceeds as follows. Sub-step 1: As the schedule is generated, each requirement is matched against the MRP Flowdown P/N Table to determine if sub-tier requirements should be specified for the part/supplier combination. Sub-step 2: Finished part number 1080775 supplied by AAA Co. is found in the table so sub-tier processing will occur. Sub-step 3: The MRP information is collected—100 pieces are needed on 6/2002.

Sub-step 4: The Supplier Relationship Table is accessed to determine the steps that will be tracked throughout the process. The Sub-tier Material/Process Table is accessed to determine the lead-time required to complete each step. The required completion date of this step is calculated by subtracting the lead-time of the previous step from the previous step's required date. The process starts using the finished part lead-time and required date.

Finished Part 1080775 Required Date=6/2002

L/T of Finish Processing=12 Weeks

Forging 90F103489 Required Date=6/2002−12 Weeks= 3/2002

Sub-step 5: The quantity/input weight per finished part is obtained by referencing the Part Material/Process Step Table. The finished part quantity required is obtained by referencing the MRP schedule. The lot size requirements are then checked. In this case, the lot requirements are 0 so no notations need to be made in reference to a lot size.

Finished Part 1080775 Qty=100

Lot requirements=0

90F103489 Qty/Input Weight Per Finished Part=1 Piece

Sub-step 6: The Sub-tier Schedule Worksheet now shows the following:

The quantity/input weight per finished part is obtained by referencing the Part Material/Process Step Table. The finished part quantity required is obtained by referencing the MRP schedule. The lot size requirements are then checked. In this case, the lot requirements are 0 so no notations need to be made in reference to a lot size.

Finished Part 1080775 Qty=100

Lot requirements=0

RM12345 Qty/Input Weight Per Finished Part=98 lbs.

The Sub-tier Schedule Worksheet now shows the following:

| Finished Part Number | Fin Part Supplier | Fin P/N Required Date | Fin P/N Required Qty | Sub-process/ Material Number | Sub-process/ Material Supplier | Required Date | Qty/Input Weight per finished part |
|---|---|---|---|---|---|---|---|
| 1080775 | AAA Co. | June 2002 | 100 | 90F103489 | Forge Co. | February 2002 | 1 |
| 1080775 | AAA Co. | June 2002 | 100 | RM12345 | Matl Co. | December 2001 | 98 lbs. |

Sub-step 7: Once the last process step is reached for that MRP requirement, processing returns to the MRP schedule until the requirement that needs sub-tier processing is found. The MRP schedule indicates that another 100 pieces of 1080775 made by AAA Co. are required on 8/2002. Sub-tier processing now occurs for this requirement.

Sub-step 8: The same calculations and evaluations are done for all requirements. Sub-steps 4–7 are repeated until all MRP requirements have been translated into sub-tier requirements.

The MRP Schedule that identified the following requirements:

| Finished Part Number | Fin Part Supplier | Fin P/N Required Date | Fin P/N Required Qty | Sub-process/ Material Number | Sub-process/ Material Supplier | Required Date | Qty/Input Weight per finished part |
|---|---|---|---|---|---|---|---|
| 1080775 | AAA Co. | June 2002 | 100 | 90F103489 | Forge Co. | February 2002 | 1 |

Sub-step 6: The Supplier Relationship Table is once again accessed to determine the next step that will be tracked throughout the process and the Sub-tier Material/Process Table is accessed to determine the lead-time required to complete this step. The required completion date of this step is calculated by subtracting the lead-time of the previous step from the previous step's required date.

Forging 90F103489 Required Date=3/2002

Forging 90F103489 L/T=12 Weeks

RM12345 Required Date=3/2002−12 Weeks=12/2001

| Finished P/N | Supplier | Quantity Required | Required Date |
|---|---|---|---|
| 1080775 | AAA Co. | 100 | June 2002 |
| 1080775 | AAA Co. | 100 | August 2002 |
| 1080775 | AAA Co. | 50 | October 2002 |
| 1080776 | AAA Co. | 100 | May 2002 |
| 1080776 | AAA Co. | 100 | July 2002 | has been translated into the following sub-tier requirements using the Sub-tier Schedule Worksheet:

| Finished Part Number | Fin Part Supplier | Fin P/N Required Date | Fin P/N Required Qty | Sub-process/ Material Number | Sub-process/ Material Supplies | Required Date | Qty/Input Weight per finished part |
|---|---|---|---|---|---|---|---|
| 1080775 | AAA Co. | June 2002 | 100 | 90F103489 | Forge Co. | February 2002 | 1 |
| 1080775 | AAA Co. | June 2002 | 100 | RM12345 | Matl Co. | December 2001 | 98 lbs. |
| 1080775 | AAA Co. | August 2002 | 100 | 90F103489 | Forge Co. | April 2002 | 1 |
| 1080775 | AAA Co. | August 2002 | 100 | RM12345 | Matl Co. | February 2002 | 98 lbs. |
| 1080775 | AAA Co. | October 2002 | 50 | 90F103489 | Forge Co. | June 2002 | 1 |
| 1080775 | AAA Co. | October 2002 | 50 | RM12345 | Matl Co. | April 2002 | 98 lbs. |
| 1080776 | AAA Co. | May 2002 | 100 | 90F32964 | Forge Co. | January 2002 | 1 |
| 1080776 | AAA Co. | May 2002 | 100 | RM12345 | Matl Co. | October 2001 | 150 lbs. |
| 1080776 | AAA Co. | July 2002 | 100 | 90F32964 | Forge Co. | March 2002 | 1 |
| 1080776 | AAA Co. | July 2002 | 100 | RM12345 | Matl Co. | December 2001 | 150 lbs. |

A sub-tier schedule is now generated for each organization and grouped by the material or process. Matl Co. and Forge Co.'s schedules will be posted to AAA Co.'s portal for review. AAA Co. will receive a notification via e-mail that that they must review the schedules. The following will be presented:

Primary Consumer MRP Schedule: AAA Co.

In a preferred embodiment, the data is presented in a format such that if there is a question as to how the required date was calculated, AAA Co. can click on a particular item and a box will pop up detailing the part information that was used to calculate the quantity and required date. AAA Co. had a question about how 100 pieces @ 98 lbs. due 2/2002 was arrived at so they clicked on that item. The following information appears:

| Finished P/N | January 2002 | February 2002 | March 2002 | April 2002 | May 2002 | June 2001 | July 2001 | August 2002 | September 2002 | October 2002 | November 2002 |
|---|---|---|---|---|---|---|---|---|---|---|---|
| 1080775 |  |  |  |  |  | 100 |  | 100 |  | 50 |  |
| 1080776 |  |  |  |  | 100 |  | 100 |  |  |  |  |

Sub-tier Schedule: Forge Co.—Primary Consumer Finished P/N 1080775, 1080776

| Material/ Process Part Number | Qty Per Finished Part | Spec | January 2002 | February 2002 | March 2002 | April 2002 | May 2002 | June 2001 |
|---|---|---|---|---|---|---|---|---|
| 90F103489 | 1 |  |  | 100 |  | 100 |  | 50 |
| 90F32964 | 1 |  | 100 |  | 100 |  |  |  |

Sub-tier Schedule: Matl Co.—Primary Consumer Finished P/N 1080775, 1080776

| Material/ Process Part Number | Spec | Size | Alloy | October 2001 | November 2001 | December 2001 | January 2002 | February 2002 | March 2002 | April 2002 |
|---|---|---|---|---|---|---|---|---|---|---|
| RM12345 | AMS5662 | 8 in. | Nickel | 100 @ 150 lbs. |  | 100 @ 98 lbs. 100 @ 150 lbs. |  | 100 @ 98 lbs. |  | 50 @ 98 lbs. |

Finished Part Information:
  P/N: 1080775
  Required Qty: 100
  Required Date: 8/2002
Additional Processing Information:
  Lead Time Of Additional Steps: 24 Weeks
    Machining—12 Weeks
    Forging—12 Weeks
  Input Weight Per Forging: 98 lbs.
Required Date Calculation:
  8/2002−24 Weeks=2/2002
In the present example, AAA Co. is satisfied with the information so they approve the sub-tier schedules.

The schedules are now made accessible by Forge Co. and Matl Co. through the portal. They are also notified via e-mail that an updated schedule is now available to them. Forge Co. accesses the portal and views the following schedule:
  Primary Consumer MRP Schedule

| Finished P/N | January 2002 | February 2002 | March 2002 | April 2002 | May 2002 | June 2001 | July 2001 | August 2002 | September 2002 | October 2002 | November 2002 |
|---|---|---|---|---|---|---|---|---|---|---|---|
| 1080775 | | | | | | 100 | | 100 | | 50 | |
| 1080776 | | | | | 100 | | 100 | | | | |

Sub-tier Schedule: Forge Co.—Primary Consumer Finished P/N 1080775, 1080776

| Material/Process Part Number | Qty Per Finished Part | Spec | January 2002 | February 2002 | March 2002 | April 2002 | May 2002 | June 2001 |
|---|---|---|---|---|---|---|---|---|
| 90F103489 | 1 | | | 100 | | 100 | | 50 |
| 90F32964 | 1 | | 100 | | 100 | | | |

Matl Co. accesses the portal and views the following schedule:
  Primary Consumer MRP Schedule: AAA Co.

| Finished P/N | January 2002 | February 2002 | March 2002 | April 2002 | May 2002 | June 2001 | July 2001 | August 2002 | September 2002 | October 2002 | November 2002 |
|---|---|---|---|---|---|---|---|---|---|---|---|
| 1080775 | | | | | | 100 | | 100 | | 50 | |
| 1080776 | | | | | 100 | | 100 | | | | |

Sub-tier Schedule: Matl Co.—Primary Consumer Finished P/N 1080775, 1080776

| Material/Process Part Number | Spec | Size | Alloy | October 2001 | November 2001 | December 2001 | January 2002 | February 2002 | March 2002 | April 2002 |
|---|---|---|---|---|---|---|---|---|---|---|
| RM12345 | AMS5662 | 8 in. | Nickel | 100 @ 150 lbs. | | 100 @ 98 lbs. 100 @ 150 lbs. | | 100 @ 98 lbs. | | 50 @ 98 lbs. |

Both suppliers can meet the required dates as presented to them so no notification is given to alert primary consumer or AAA Co. of a potential problem.

EXAMPLE 2

The following illustrates an alternative embodiment of the invention whereby the Part Material/Process Step Table of the present invention comprises an additional column indicative of whether raw material arrives directly to the primary consumer or indirectly through a finished part supplier.

Specifically, the Part Material/Process Step Table is altered to appear as:

| Finished P/N | Step Sequence | Process/Material No. | Description | Qty/Input Weight per finished Part | Size | Direct/Indirect |
|---|---|---|---|---|---|---|

Note the inclusion of the column titled "Direct/Indirect". As a result, maintainers of the Part Material/Process Step Table have the ability to designate whether raw material arrives directly to the primary consumer or indirectly through a finished part supplier. Appropriate denotation can be accomplished by setting the Direct/Indirect field to Direct or Indirect. This exception allows Process/Matl information to be kept for suppliers in the case that they are shipping raw material directly to the primary consumer. Typically, applications do not store Process/Matl information for direct suppliers as legacy information systems already satisfy this requirement. Since raw material suppliers ship unfinished parts directly and indirectly to the primary consumer, they have a need to see Process/Matl information in both cases to help give them their total Process/Matl requirements.

The following table illustrates the above scenarios for both indirect and direct material flow to the primary consumer:

| Part Number | Step Sequence | Process/Matl # | Description | Qty/Input Weight per Finished Part | Size | Direct/ Indirect |
| --- | --- | --- | --- | --- | --- | --- |
| 91F4656 | 1 | FG12345 | Forging | 1 | N/A | Direct |
| 91F4656 | 2 | RM4545 | Raw Material | 98 lbs | 8" | — |
| 4656 | 1 | FG12345 | Forging | 1 | N/A | Indirect |
| 4656 | 2 | RM4545 | Raw Material | 98 lbs | 8" | — |

In the case of part number 91F4656, the forging arrives directly to the primary consumer. Therefore, Process/Matl information is kept for both associated step sequences. In the case of part number 4656, the same forging is shipped indirectly to the primary consumer through a finished part supplier. Since the Indirect setting is selected, the application assumes that a finished part supplier will not need Process/Matl information in the application. Again, Process/Matl information is kept for both associated step sequences although there is actually a third supplier responsible for providing a finished part to the primary consumer.

It is apparent that there has been provided in accordance with the present invention a method for generating a master sub-tier schedule. which fully satisfies the objects, means, and advantages set forth previously herein. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A method of producing a master sub-tier schedule for a Multi-tier Manufacturing Requirements Planning (MRP) system comprising the steps of:

populating a database with a plurality of identified part/supplier combinations for at least one finished part;

populating said database with a plurality of sub-process steps associated with each of said at least one finished part;

populating said database with at least one supplier responsible for each of said plurality of sub-process steps;

populating said database with at least one lead time and at least one lot requirement associated with each of said plurality of sub-process steps;

accessing said database to calculate at least one line item of a sub-tier schedule, said at least one line item comprising at least one sub-tier schedule quantity and at least one requirement date corresponding thereto;

adding each of said at least one line item to form a master sub-tier schedule on said database;

breaking down said master sub-tier schedule by each of said at least one supplier;

providing access to said master sub-tier schedule to a primary consumer, at least one first-tier supplier and at least one sub-tier supplier;

reviewing said master sub-tier schedule; and sending notification to said primary consumer and said first tier supplier if necessitated by said reviewing of said master sub-tier schedule.

2. The method of claim 1 wherein said populating said database with said plurality of part/supplier combinations and said plurality of said sub-process steps is performed by said primary consumer.

3. The method of claim 1 wherein said populating said database with said at least one supplier is performed by at least one first-tier supplier or at least one sub-tier supplier.

4. The method of claim 1 wherein said populating said database with said at least one lead time and at least one lot requirement is performed by said at least one first-tier supplier or said at least one sub-tier supplier.

5. The method of claim 1 wherein said at least one first-tier supplier or at least one sub-tier supplier populate said database via a supplier portal.

6. The method of claim 1 wherein said at least one first-tier supplier or at least one sub-tier supplier populate said database via a file capable of uploading to said database.

7. The method of claim 1 wherein said reviewing of said master sub-tier schedule comprises the addition of storing a timeframe for revisions on said database.

8. The method of claim 1 wherein said storing said timeframe is performed by a system administrator.

9. The method of claim 1 wherein at least one first-tier and sub-tier supplier can review only a portion of said master sub-tier schedule relating to each respective at least one first-tier and sub-tier supplier.

10. The method of claim 1 wherein said at least one first-tier supplier or at least one sub-tier supplier populate said database via a system to system link.

11. The method of claim 1 wherein the step of populating said database with a plurality of sub-process steps associated with each of said at least one finished part comprises the additional step of designating each of said at least one finished part as direct or indirect.

* * * * *